US012632386B2

(12) United States Patent
Sahin et al.

(10) Patent No.: US 12,632,386 B2
(45) Date of Patent: May 19, 2026

(54) DYNAMIC BATTERY-BASED CACHE SIZE MANAGEMENT

(71) Applicant: Dell Products L.P., Round Rock, TX (US)

(72) Inventors: Adnan Sahin, Needham, MA (US); Owen Martin, Hopedale, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/787,658

(22) Filed: Jul. 29, 2024

(65) Prior Publication Data

US 2026/0030167 A1 Jan. 29, 2026

(51) Int. Cl.
*G06F 12/08* (2016.01)
*G06F 12/0868* (2016.01)
(52) U.S. Cl.
CPC ................................ *G06F 12/0868* (2013.01)

(58) Field of Classification Search
CPC .................................................... G06F 12/0868
USPC ......................................................... 711/129
See application file for complete search history.

(56) References Cited

U.S. PATENT DOCUMENTS

2004/0054484 A1* 3/2004 Farabaugh ........... G01R 31/386
702/63
2021/0116984 A1* 4/2021 Chen ...................... G06F 1/3296
2021/0173782 A1* 6/2021 Krasner .............. G06F 12/0223

* cited by examiner

*Primary Examiner* — Hua J Song
(74) *Attorney, Agent, or Firm* — Krishnendu Gupta; Nikhil Patel

(57) ABSTRACT

One or more aspects of the present disclosure relate to dynamic battery-based cache size management. In embodiments, a charge level of a battery configured to provide power to a storage array is monitored. Further, a size of a mirrored write cache partition of system memory in the storage array is dynamically adjusted based on the charge level of the battery.

16 Claims, 7 Drawing Sheets

700

702 monitoring a charge level of a battery configured to provide power to a storage array 704 dynamically adjusting a size of a mirrored write cache partition of system memory in the storage array based on the charge level of the battery

400

Charge %
502

Max Charge
506

514

510

512

Time
504

Legend

Mirrored Memory
Segment Size
508

700 monitoring a charge level of a battery configured to provide power to a storage array

702 dynamically adjusting a size of a mirrored write cache partition of system memory in the storage array based on the charge level of the battery

704

DYNAMIC BATTERY-BASED CACHE SIZE MANAGEMENT

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to dynamic battery-based cache size management. In embodiments, a charge level of a battery configured to provide power to a storage array is monitored. Further, a size of a mirrored write cache partition of system memory in the storage array is dynamically adjusted based on the charge level of the battery.

In embodiments, the adjusted size of the mirrored write cache partition can be selected to ensure the mirrored write cache partition is vaultable in response to a power loss and the charge level of the battery.

In embodiments, a fast charge time of the battery can be minimized by controlling a charging operation based on a degradation model of the battery. Additionally, the fast charge time can be reduced based on an age of the battery.

In embodiments, real-time repartitioning of the mirrored write cache partition can be performed as the charge level of the battery increases.

In embodiments, a fast charge of the battery can be performed until a fast charge level is reached. For example, the fast cache level can be a portion of a maximum charge level of the battery.

In embodiments, a voltage of a power source can be increased to a fast charge voltage threshold to perform the fast charge of the battery.

In embodiments, a trickle charge of the battery can be performed after performing a fast charge of the battery until a trickle charge level of the battery is reached. The trickle charge level can be greater than the fast charge level and less than the maximum charge level of the battery.

In embodiments, a voltage of a power source can be decreased to a trickle charge voltage threshold to perform the trickle charge of the battery.

In embodiments, the trickle charge voltage threshold can be selected to extend a lifetime of the battery.

In embodiments, write operations to the storage array can be delayed when the charge level of the battery is insufficient to support vaulting of a current size of the mirrored write cache partition. Additionally, acknowledging write operations received by the storage array can be refrained.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
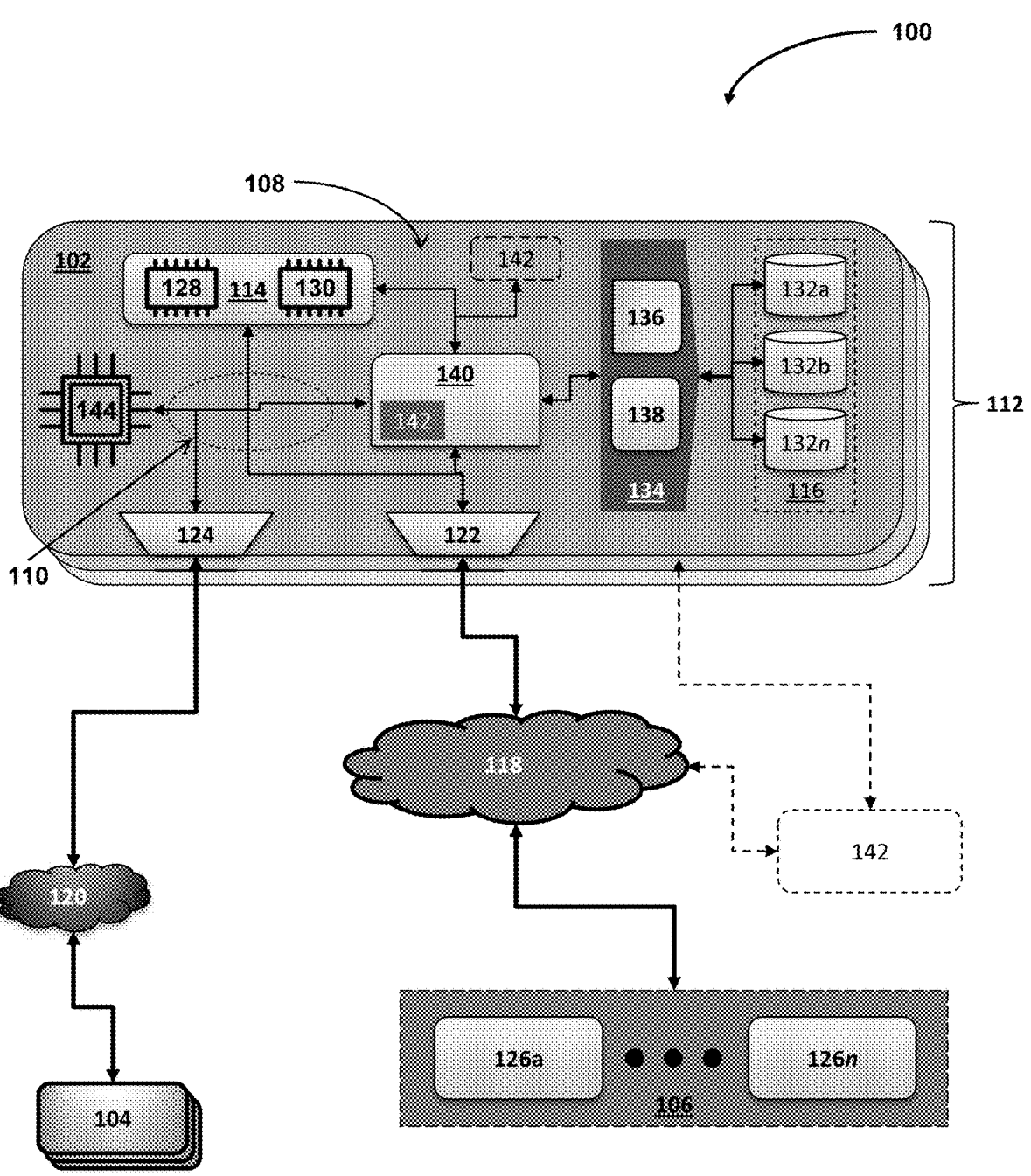
FIG. 1 illustrates a distributed network environment in accordance with embodiments of the present disclosure.

A business like a financial or technology corporation can produce large amounts of data and require sharing access to that data among several employees. Such a business often uses storage arrays to store and manage the data. Because a storage array can include multiple storage devices/disk drives (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Further, storage arrays can employ write cache memory, a high-speed storage mechanism that temporarily holds data before it is permanently written to the array's disk drives. The primary function of write cache memory is to enhance system performance by allowing the storage array to quickly acknowledge write requests from host systems without waiting for the data to be physically written to slower disk media. Thus, storage arrays can use a write cache to temporarily store data before permanently being written to non-volatile storage media. This capability is crucial in reducing latency and improving the throughput of write operations.

In the context of a financial institution, the use of write cache memory in storage arrays becomes particularly significant. Financial institutions handle a vast amount of transactional data daily, including withdrawals, deposits, transfers, and other types of financial transactions. Each transaction involves data that must be quickly and reliably processed and stored. For example, when a customer initiates a money transfer, the transaction data is first written to the write cache. This allows the transaction to be processed almost instantaneously from the user's perspective, enhancing customer satisfaction through faster service.

However, the reliance on write cache also introduces risks, particularly in power failure scenarios. If a power outage occurs before the data in the write cache is permanently written to disk, there is a risk of data loss. This could result in financial discrepancies, such as unrecorded deposits or withdrawals, leading to financial losses and affecting the integrity of the financial institution's data.

To mitigate these risks, financial institutions often implement robust battery-backed power systems that ensure enough power is available to write the cached data to disk in case of a power failure. This process, known as vaulting, is critical to maintaining data integrity and ensuring that all financial transactions are accurately recorded and preserved, even in adverse conditions. Managing these systems, including optimizing battery usage and adjusting write cache size based on battery charge levels, is crucial to modern storage array operations.

The effectiveness of such battery backup systems is inherently tied to the battery's charge level, which can vary based on numerous factors, including the battery's age, charge-discharge cycles, and the operational environment. Managing these variables to ensure optimal battery performance and longevity while preventing data loss during power failures is a critical concern in the design and operation of storage arrays. Further, data loss risk is particularly pronounced in scenarios involving back-to-back power failures where the system may not have sufficient time to restore power and secure the cached data.

The core of the problem lies in the dependency of the write cache's effectiveness on the available battery charge within the storage array's uninterruptible power supply (UPS). Traditional systems do not dynamically adjust the size of the write cache based on the current battery charge level. This oversight can lead to situations where the write cache is too large to be fully vaulted (secured to non-volatile storage) within the available battery life during a power outage, thereby increasing the risk of data loss.

This problem is critical in environments requiring high data integrity and availability, such as financial institutions, healthcare systems, and other enterprise applications, where even minimal data loss can have significant adverse effects.

Embodiments of the present disclosure address the critical issue of data vulnerability in storage arrays during power failures by introducing a dynamic and intelligent management system for write cache size based on the battery charge level. This system ensures data integrity and minimizes the risk of data loss even in unstable power conditions.

The embodiments include techniques for dynamically adjusting the size of the mirrored write cache partition in the storage array's system memory. This adjustment is directly based on the real-time monitoring of the battery's charge level. For example, as the battery charge decreases, the embodiments can reduce the size of the mirrored write cache. This ensures that the amount of data in the write cache never exceeds what can be safely written to non-volatile storage (vaulted) during a power outage based on the current battery capacity.

In addition, the embodiments can include a battery feedback model that continuously receives and processes charge percentage data from the battery. This model allows the embodiments to set and adjust the mirrored write cache size in real time, ensuring it aligns with the battery's ability to support data vaulting during power interruptions.

Further, to extend the battery's lifespan and maintain its efficiency, the embodiments can strategically minimize the time the battery is subjected to fast charging. Specifically, fast charging, while quick, can significantly degrade battery health over time. Thus, the embodiments can include a battery recharge model that controls the charging operations, emphasizing a reduction in fast charge time as the battery ages. This approach not only preserves battery health but also ensures it can provide reliable backup power when needed.

The embodiments can also perform real-time repartitioning of the mirrored write cache as the battery's charge level changes. This feature allows the embodiments to dynamically and continuously adapt to changing power conditions without manual intervention, enhancing a storage array's resilience to power fluctuations.

Additionally, the embodiments can include techniques for managing trickle charging of the battery. For example, after fast charging to a predetermined level (e.g., 80% of the desired charge level), the embodiments can switch to a trickle charge mode for the remaining charge. Although this charging method is slower, it is significantly less harmful to the battery's long-term health. Accordingly, the embodiments can manage the transition from fast to trickle charging to maintain the battery within optimal charging parameters, balancing performance needs with battery health.

Furthermore, in scenarios where the battery charge is insufficient to support the vaulting of the current size of the mirrored write cache, the embodiments can delay write operations. This prevents new write data from entering the cache until it is safe, thereby avoiding accumulating unvaultable data.

Advantageously, the embodiments enhance the reliability and efficiency of storage arrays, particularly in environments where data integrity is paramount. By intelligently managing the write cache and battery resources, the embodiments significantly mitigate the risk of data loss during power failures, ensuring continuous data availability and system reliability.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global/system memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
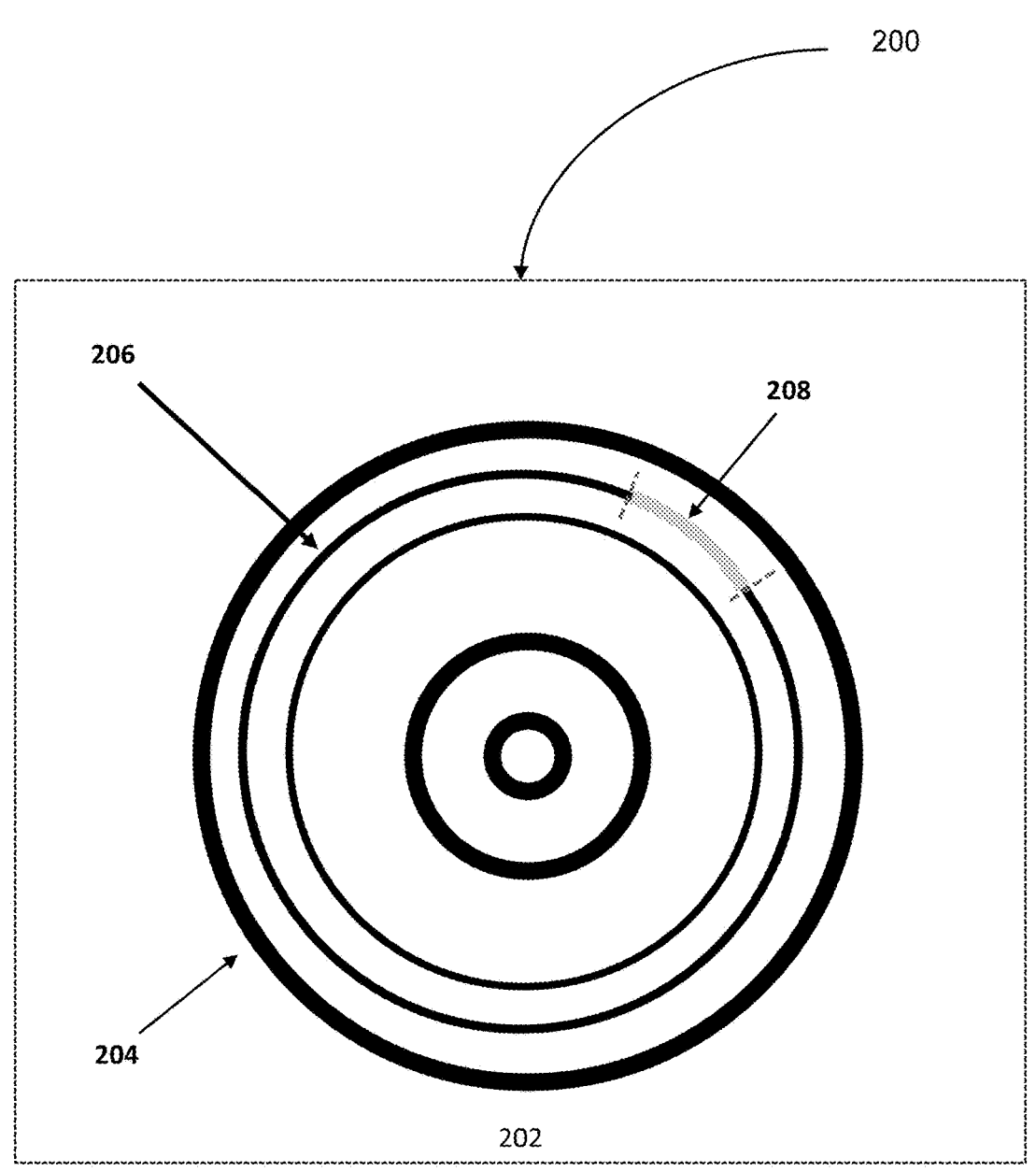
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132a-n. For example, the EDS 140 can provide a host, e.g., client machine 126a, with a virtual storage device (e.g., thin-device (TDEV)) that logically represents zero or more portions of each storage device 132a-n. For example, the EDS 140 can establish a logical track using zero or more physical address spaces from each storage device 132a-n. Specifically, the EDS 140 can establish a continuous set of logical block addresses (LBA) using physical address spaces from the storage devices 132a-n. Thus, each (LBA) represents a corresponding physical address space from one of the storage devices 132a-n. For example, a track can include 256 LBAs, amounting to 128 kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
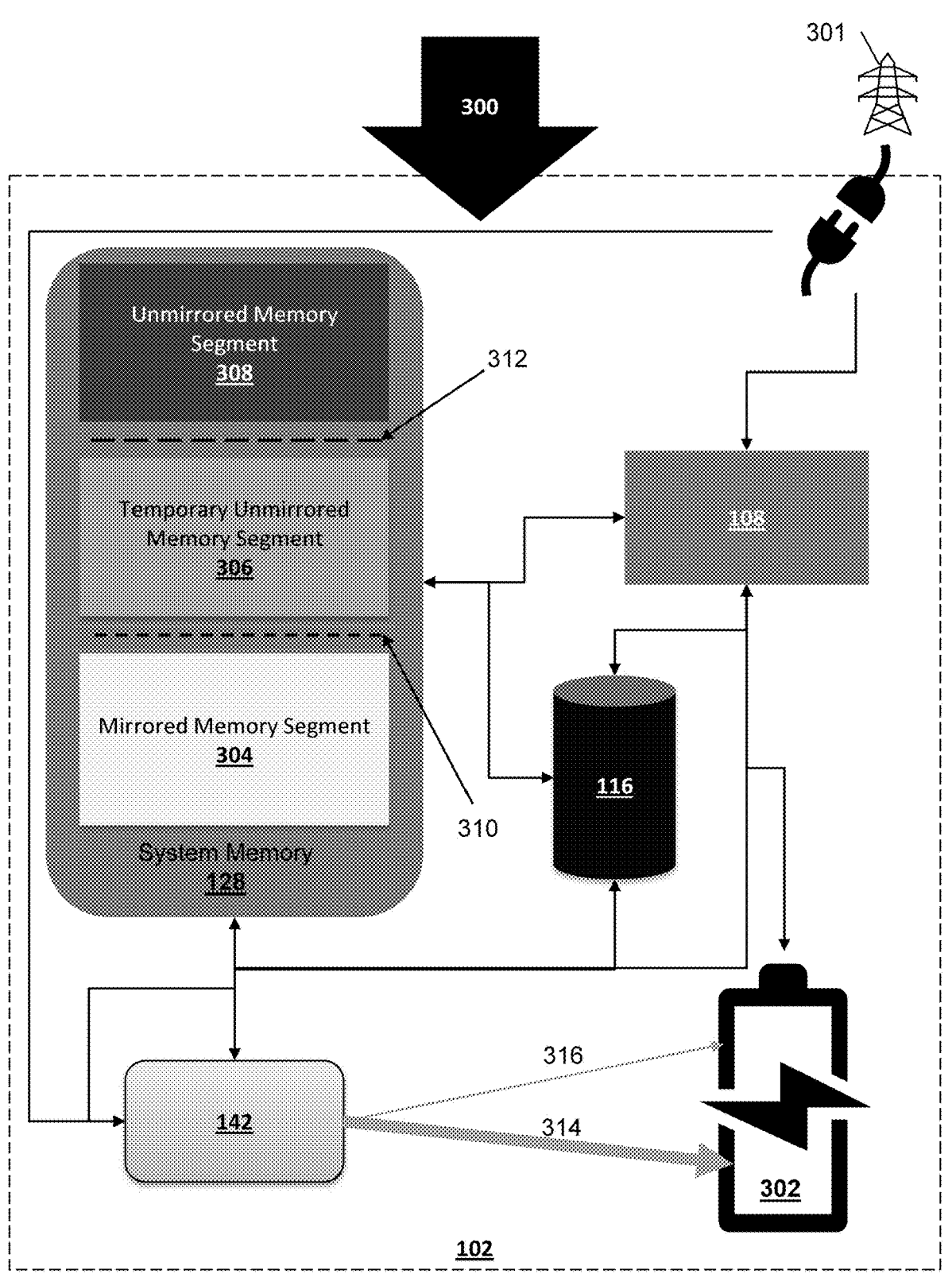
FIG. 3 is a block diagram of dynamically sized system memory in accordance with embodiments of the present disclosure.

Regarding FIG. 3, a storage array 102 can store data on multiple hard disks of the array's persistent storage 116. In particular, the storage array 102 can receive one or more input/output (IO) operations 300 from one or more hosts (e.g., the hosts 106 of FIG. 1). The storage array 102 can also include a controller 142 that manages IO operations 300, including read and write requests, using a combination of volatile system memory 128 (e.g., DRAN) and non-volatile persistent storage 116 (e.g., SSDs or HDDs).

In embodiments, the controller 142 can partition the system memory 128 into a mirrored memory segment 304 and an unmirrored memory segment (e.g., the temporary unmirrored segment 306 and the unmirrored segment 308). Mirrored memory refers to a portion of the cache duplicated or mirrored across different memory modules or systems. This redundancy is crucial for protecting data integrity and availability. Unmirrored cache memory refers to a cache that is not duplicated. It is used to store data temporarily without the redundancy provided by mirroring.

When data is written to a mirrored cache corresponding to the mirrored memory segment 304, it is simultaneously written to two separate locations. This mirroring is typically managed by the controller 142, ensuring that both copies are consistent and current. The storage array 102 can use the mirrored cache to prevent data loss in the event of a hardware failure, such as a memory module failure. If one module fails, the data can still be retrieved from its mirror. Mirrored cache is often used for write requests where data integrity is critical. For example, database transactions, financial data processing, or any application where data loss could result in significant operational issues or corruption. Thus, the mirrored cache can help ensure that no in-flight data is lost. For example, in-flight data includes data currently being processed or transmitted within the storage array 102 but has not yet been permanently written to non-volatile storage 116.

Data written to an unmirrored cache is stored in a single location, which can be accessed more quickly than a mirrored cache due to the absence of duplication overhead. The unmirrored cache is typically used for less critical data or read cache, where the data is also stored permanently on non-volatile storage and can be retrieved from, e.g., the persistent storage 116 if the cache fails.

In embodiments, when the storage array 102 receives an IO operation with a read request, the controller 142 checks the volatile system memory (cache) 128 to determine if the requested data is already available (cache hit). If the data is in the cache, the storage array 102 immediately sends the data back to the requester, significantly reducing access time. If the data is not in the cache (cache miss), the controller 142 retrieves it from the non-volatile persistent storage 116. Once retrieved, the controller 142 can also store the data in the system memory 128 to facilitate faster access for potential future requests.

In embodiments, when the storage array 102 receives an IO operation with a write request, the controller 142 writes the request's corresponding data to one or more cache slots of the mirrored memory segment 304 to ensure quick acknowledgment to the source host of the IO operation that the data has been "safely" stored. This approach allows the storage array to handle subsequent operations without waiting for the data to be written to slower, non-volatile storage (i.e., destaged to disk). Thus, the storage array 102 can acknowledge write operations when the data is safely stored in the volatile memory. This acknowledgment is crucial for the host system to proceed with other tasks, knowing that the data integrity is maintained.

Further, the controller 142 can destage cached write operation data to disk, which includes transferring data from volatile system memory 128 to non-volatile persistent storage 116. Additionally, the controller can periodically write data in the write cache of the mirrored memory segment 304 to the persistent storage 116 in response to specific criteria. For example, the criteria can include the cache reaching capacity, a scheduled time interval, or lower system usage periods.

In embodiments, the storage array 102 can receive power from a primary power source, 301, that provides a continuous and stable electricity supply under normal operating conditions. The primary power source 301, typically an electric power grid, is crucial in ensuring uninterrupted data storage operations due to its proven reliability and ability to supply the high levels of power required by modern data centers, including the storage array 102.

Under certain conditions, the primary power source (e.g., the electric power grid) 301 can face disturbances such as brownouts and blackouts. A brownout, a temporary voltage drop, is a mild form of power disruption. In contrast, a blackout, a complete power loss to an area, is a severe event that can be localized or widespread, affecting entire cities or regions.

In the event of power failures, data that has not been permanently written to non-volatile persistent storage (like hard disks or SSDs) 116 risks being lost. This data typically resides temporarily in volatile memory (like DRAM) 128, which requires power to maintain data. The controller 142 performs vaulting, ensuring that this data is safely transferred to non-volatile storage, thus preventing data loss. But it's not just about preventing data loss. Vaulting ensures that data remains available for access and use immediately after power is restored. This is not just important; it's crucial for systems requiring high availability and minimizing downtime, which can be costly in critical applications.

In embodiments, the controller 142 can continuously monitor the primary power supply 301. If a drop in power is detected, it triggers the vaulting process. Upon detecting a power failure, the controller 142 immediately begins transferring data from volatile memory (such as DRAM) 128, where it is temporarily held, to non-volatile memory (like SSDs or HDDs) 116. However, this transfer needs to happen quickly and efficiently to ensure data is secured before the complete loss of power.

Because the storage array 102 should maintain high uptime and data integrity, it can include a backup power supply 302 (e.g., a battery) to keep the storage array 102 running briefly during a power outage. This temporary power gives the controller 142 enough time to transfer all critical data to non-volatile storage 116.

In embodiments, the controller 142 can dynamically adjust the size of the mirrored memory segment 304 based on the battery's charge level. In particular, the controller 142 can dynamically adjust the size of the mirrored memory segment 304 by using cache slots from the temporary unmirrored memory segment 306. This ensures that only the amount of data that can be safely written to non-volatile storage 116 during a power outage is kept in volatile memory 128 at any time. For example, the controller 142 can maintain a mirrored memory segment 304 where data is duplicated to safeguard against data loss. Additionally, the controller 142 can adjust the size of the mirrored memory segment 304 in real-time based on the battery's charge level to ensure it can always be vaulted in case of sudden power loss.

For example, the controller 142 can dynamically set a real-time threshold 310 that denotes the maximum percentage of system memory 128 that can be allocated as a mirrored memory segment 304. The controller 142 can dynamically set the real-time threshold 310 based on the current battery charge level, ensuring that there is always sufficient battery power to support the mirroring process during power failures. Additionally, the controller 142 can set an upper limit 312 for the mirrored memory segment 304 to handle incoming write operations. The upper limit 312 can be based on the maximum charge level of the backup power supply 302, the current operational needs of the storage array 102, the total capacity of the system memory 128, and the like.

In embodiments, the controller 142 can employ a combination of fast and trickle charging strategies to optimize battery life and performance. Fast charging 314 quickly brings the battery to a level sufficient to support immediate data vaulting needs, while trickle charging 316 maintains the battery at optimal levels without degrading its lifespan.

Figure 4:
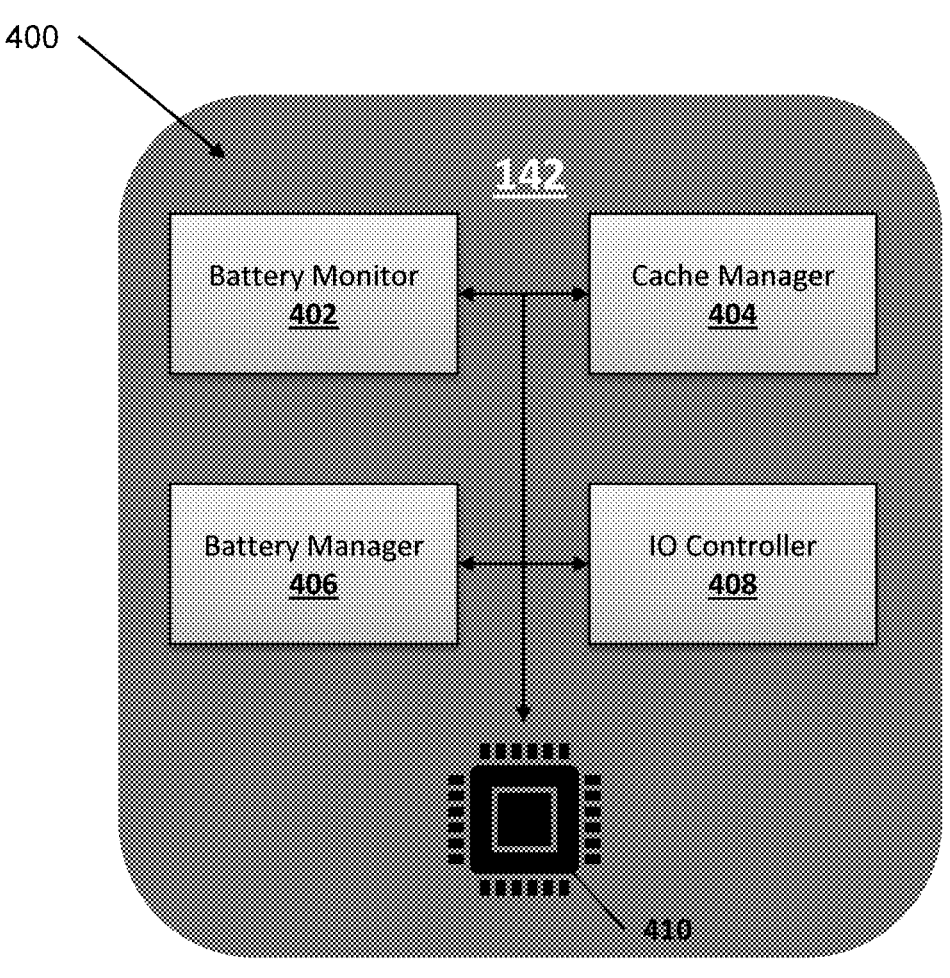
FIG. 4 is a block diagram of a controller in accordance with embodiments of the present disclosure.

Regarding FIG. 4, the controller 142 can include logic, hardware, and circuitry 400 that dynamically adjusts a mirrored memory segment (e.g., the segment 304 of FIG. 3) of system memory (e.g., the system memory 128 of FIG. 3) based on the battery's charge level, enhancing data integrity and battery life in unstable power environments. The controller 142 can manage battery charging to minimize fast charging and incorporates a degradation model to extend battery lifespan. Additionally, the controller 142 can delay write operations when the battery charge is insufficient, ensuring data safety and system reliability.

In embodiments, the controller 142 can include a battery monitor 402 that continuously monitors the current charge level of the battery (e.g., the backup power supply 302 of FIG. 3) that provides backup power to the storage array (e.g., the storage array 102 of FIG. 3). The battery monitor 402 can include voltage and current sensors (not shown) that measure the electrical parameters of the battery. These sensors can be highly sensitive and accurate, providing precise data on the battery's state.

Accordingly, the battery monitor 402 can collect raw data from the sensors and include analog-to-digital converters that transform the analog signals from the sensors into digital data that the controller's software can process. The battery monitor 402 can process the digital data using signal processing techniques. For example, the signal processing techniques can include filtering noise out of the data and calibrating the sensor readings to account for environmental factors or sensor aging. The battery monitor 402 can calculate the battery's charge percentage using the processed digital data. This calculation can include integrating the current flow into and out of the battery over time to accurately estimate charge and discharge cycles. Further, the battery monitor 402 can maintain a data structure that tracks the battery's charge level in a local memory 410.

In embodiments, the controller can include a cache manager 404 that dynamically adjusts the size of the mirrored memory segment of the storage array's system memory (e.g., the mirrored memory segment 304 and the system memory 128 of FIG. 3). Specifically, the cache manager 404 can adjust the size of the mirrored memory segment based on the battery's charge level. Thus, the cache manager 404 can ensure that the storage array can handle write operations effectively without risking data loss during power failures.

The cache manager 404 can use the data from the battery monitor 402 to calculate the optimal size of the mirrored memory segment that can be safely vaulted in case of a power failure. Thus, the cache manager 404 can increase or decrease the size of the mirrored memory segment in real time, ensuring that the storage array always operates within safe data limits. Additionally, the cache manager 404 can integrate data from various sources within the storage array system, including current write demands, battery status, and historical data usage patterns. This integration helps the cache manager 404 make informed decisions on mirrored memory segment size adjustments.

For instance, the cache manager 404 can include logic, hardware, and circuitry that partitions the system memory into mirrored and non-mirrored segments. The mirrored segment is directly influenced by the battery's ability to support data vaulting, adjusting dynamically as the battery charge changes. Additionally, the cache manager 404 can continuously monitor the performance impact of mirrored memory segment size adjustments. It ensures that changes in the mirrored memory segment size do not adversely affect the overall performance of the storage array.

Figure 5:
FIG. 5 is a graph showing the dynamic sizing of mirrored system memory based on a battery charge in accordance with embodiments of the present disclosure.
Figure 5:
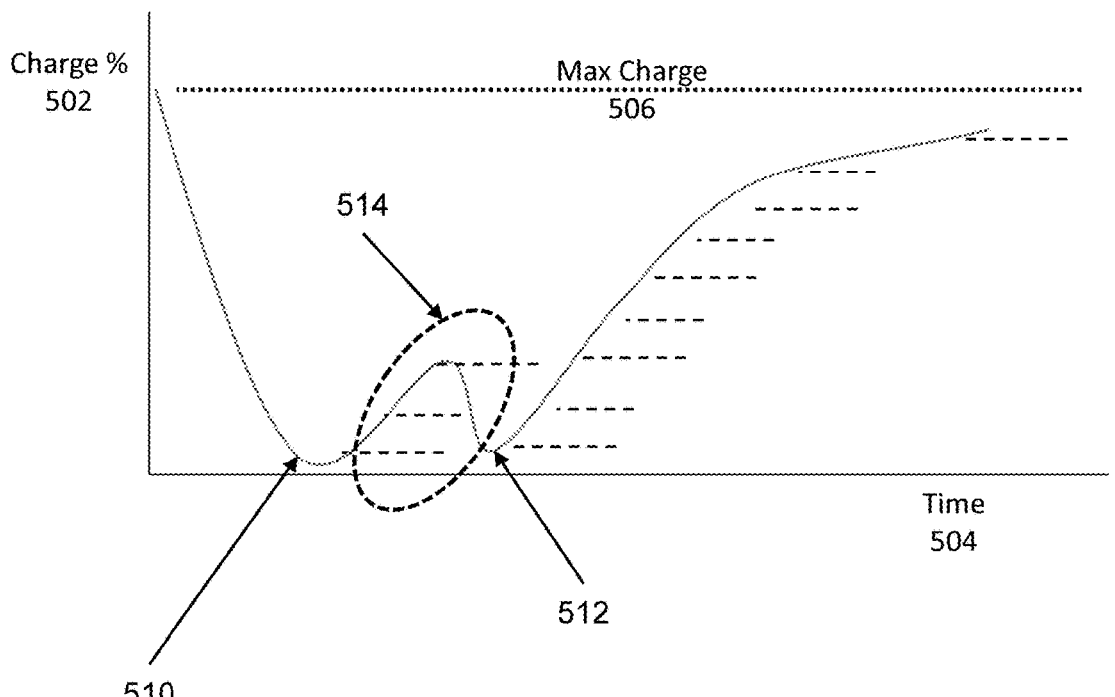
Figure 5:
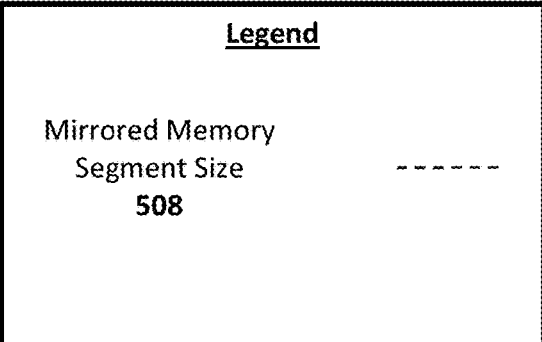

Regarding FIG. 5, a battery charge graph 500 shows how a storage array can experience back-to-back power failures of its primary power source (e.g., the storage array 102 and the primary power source 301 of FIG. 3). In particular, the battery charge graph 500 shows a battery charge percentage 502 over time 504. In response to a power failure of its primary power source, the storage array can include a backup power source (e.g., the battery backup 302 of FIG. 3) that allows the storage array's controller (e.g., the controller 142 of FIG. 4) to vault data from a mirrored memory segment of the storage array's system memory to persistent storage (e.g., the mirrored memory segment 304, system memory 128, and persistent storage 116 of FIG. 3).

In embodiments, the backup power source can have a maximum charge 506. In response to a first power failure 510, the controller's cache manager (e.g., the cache manager 404 of FIG. 4) can receive a current battery charge level from the controller's battery monitor (e.g., the battery monitor 402 of FIG. 4). Based on the battery's remaining charge, the cache manager calculates the maximum mirrored memory segment size 508 that can be safely mirrored and vaulted (i.e., saved to non-volatile storage) before the battery is depleted. If the current mirrored memory segment size 508 exceeds this calculated safe limit, the cache manager can reduce the mirrored memory segment size 508 by marking excess data as non-mirrored, prioritizing data based on criticality and other predefined criteria. Thus, the data within the newly adjusted mirrored memory segment is then vaulted to non-volatile storage (e.g., the persistent storage 116 of FIG. 3). This process is expedited to minimize the time the data is at risk, and it is closely monitored to ensure completion before the battery charge drops to a critical level.

In response to a return of the primary power source, the cache manager can dynamically increase the mirrored memory segment size 508 based on the battery's charge percentage 502. For example, the battery charge graph 500 shows the growth 514 of the mirrored memory segment size 508 after a first power failure 510 and return of the primary power source. Sometimes, a second power failure 512 can occur before the battery has been sufficiently recharged. In such a circumstance, the cache manager can further decrease the mirrored memory segment size 508 or maintain the current size if no new data has been written since the first adjustment.

Suppose, for example, the storage array includes a 100 gigabyte (GB) mirrored memory segment, and its battery initially charged to 50% of its total capacity; the cache manager can adjust the mirrored memory segment size 508 in response to back-to-back power failures as follows. After the first power failure 510, the battery monitor can report a drop to 30% of the battery charge to the cache manager. In response to receiving, the cache manager can determine that only 60 GB of data can be safely vaulted with the available battery power. Accordingly, the cache manager can reduce the mirrored memory segment size from 100 GB to 60 GB, prioritizing critical data for retention in the mirrored segment. Further, the cache manager can vault the 60 GB of mirrored data to non-volatile storage.

After the first power failure 510 and during a battery recharge process, suppose, for example, a second power failure 512 can occur, with the battery only recovering to 20% charge. In such a circumstance, the cache manager can calculate that only 30 GB can now be safely vaulted. Additionally, the cache manager can further reduce the mirrored cache segment size 508 to 30 GB, again prioritizing the most critical data. Further, the cache manager can vault the data from reduced mirrored memory segment to non-volatile storage. Once power stability is restored, the cache manager oversees a controlled recharge of the battery, preparing the storage array to return to normal operations and gradually restoring the mirrored memory segment size 508 as the battery charge level 502 improves.

Referring back to FIG. 4, the controller 142 can include a battery manager 406 that manages the charging process of the storage array's backup power source (e.g., the battery) to minimize the impact on battery health, extending the battery's lifespan. In particular, the battery manager 406 can implement a degradation model that considers the battery's age, usage patterns, and historical charge data to optimize charging methods. For example, the battery manager 406 can control charging circuitry to switch between fast and trickle charging modes, reducing the stress on the battery and preventing premature degradation.

In embodiments, the battery manager 406 can manage the charging and discharging processes of the battery to minimize wear and extend its service life. For instance, the battery manager 406 can incorporate a battery degradation model that predicts how the battery's capacity and performance will decline over time. This model considers factors such as charge cycles, depth of discharge, temperature, and charging speed. Based on the degradation model, the battery manager 406 can develop optimized charging strategies that balance the need for quick charging against the impact of such charging on battery health. It dynamically adjusts the charging rate, deciding when to use fast charging and when to switch to trickle or standard charging to maximize battery life.

In embodiments, the battery manager 406 can be equipped with sensors that monitor various battery health indicators, such as voltage, current, temperature, and impedance. These sensors provide real-time data for assessing the battery's condition and predicting its lifespan. By continuously analyzing the battery's health data, the battery manager 406 can predict potential failures before they occur. It generates alerts for preventive maintenance or battery replacement, ensuring the storage array operates reliably without unexpected downtimes.

Further, the battery manager 406 can determine the battery's age using historical data, initial configuration information, and ongoing operational metrics. When the battery is first installed, the battery manager 406 can record its manufacturing date, which is often encoded in the battery's serial number or accessible through its embedded electronic data (such as a smart battery data chip). This manufacturing date provides a baseline for understanding the chronological age of the battery. The battery manager 406 can also record when the battery is installed and first used in the storage array. This is crucial because a battery might degrade slightly even when not in use, especially if stored for an extended period under non-ideal conditions.

Additionally, the battery manager 406 can determine the battery's age using operational metrics, including charge cycles and depth of discharge (DoD). One of the most critical factors in determining a battery's age in operational terms is the number of charge cycles it has undergone. A charge cycle occurs when a battery is charged and then discharged, regardless of whether this is done in one go or incrementally over time. The battery manager 406 can track each cycle, using this data to assess wear and degradation. DoD is a metric that indicates how deeply the battery is discharged on average during its use. Frequent deep discharges can accelerate aging more than shallow discharges. Accordingly, the battery manager 406 calculates the average DoD to adjust the battery's estimated health and lifespan.

The battery manager 406 can also use health monitoring sensors to determine the battery's age. The sensors can obtain voltage and impedance measurements corresponding to the battery. For example, over time, a battery's internal resistance (impedance) can increase, and its ability to hold charge (as reflected in its voltage profiles under load and during charging) can decrease. The battery manager 406 can infer the battery's aging process by continuously monitoring these parameters.

Figure 6:
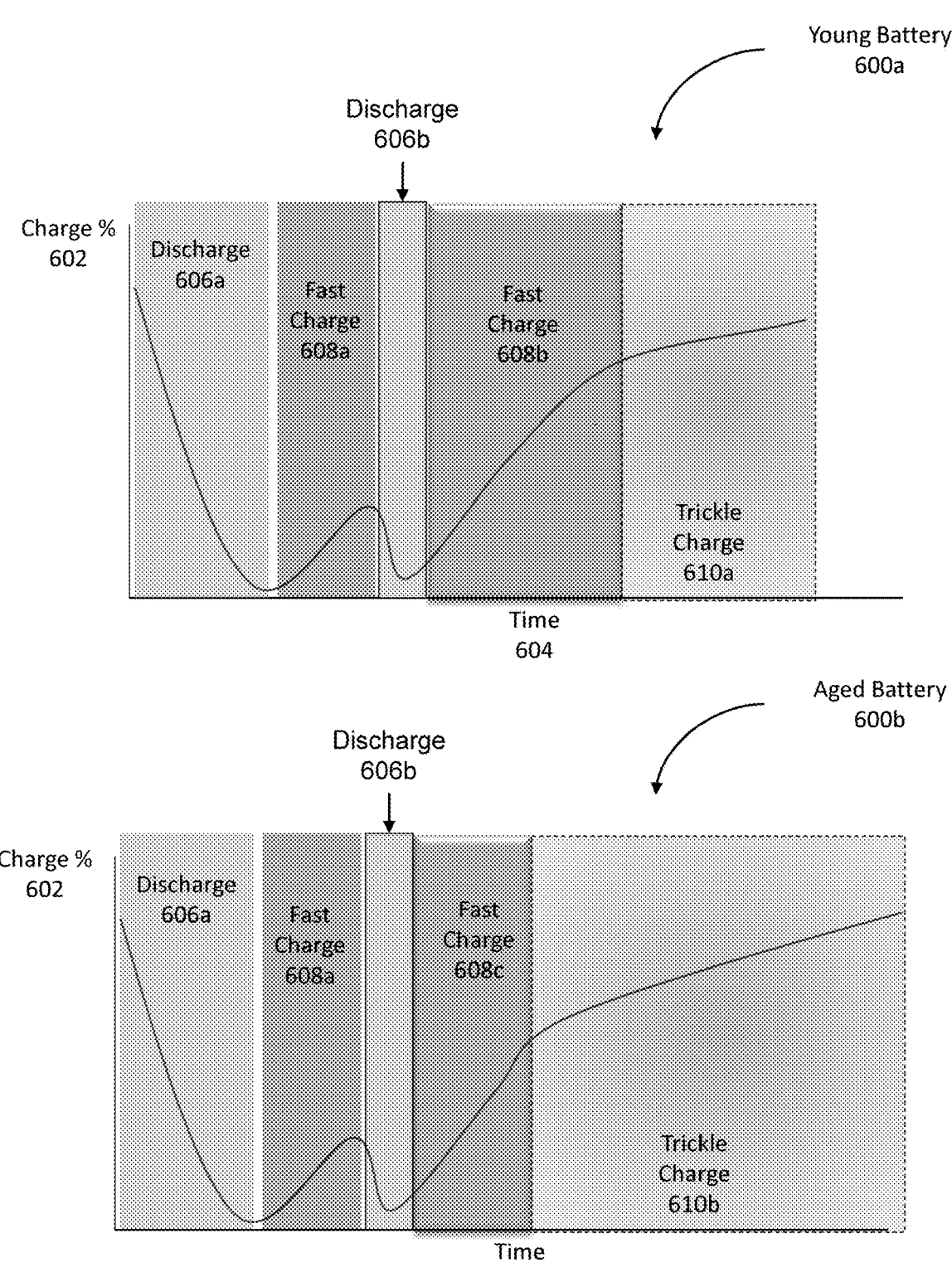
FIG. 6 illustrates graphs of fast charge and trickle charge durations based on a battery's age in accordance with embodiments of the present disclosure.

Regarding FIG. 6, the battery manager 406 of FIG. 4 can adjust a young battery's fast charge and trickle charge durations vs. an aged battery. As batteries age, their internal chemistry changes, leading to increased internal resistance and decreased capacity. These changes affect how the battery should be charged to maximize its lifespan and maintain efficiency. The battery manager 406 uses the battery's age to tailor the charging strategy, which is determined through methods such as tracking charge cycles and analyzing voltage and impedance trends.

For example, a young battery graph 600a and an aged battery graph 600b of battery charge percentage 602 over time 604 show charge durations after first and second battery discharge events 606a-b (e.g., due to a primary power supply failure). When the battery is new, it can typically handle faster charging speeds without significant degradation. Accordingly, the battery manager 406 can allow for a relatively longer fast charge duration 608b during this period to quickly bring the battery to a significant percentage of its capacity (e.g., 80%). Subsequently, the battery manager 406 can establish a trickle charge duration 610a to bring the battery to, e.g., 100%. capacity In embodiments, the battery manager 406 can continuously monitor health metrics such as charge capacity, cycle count, and internal resistance. As these metrics indicate aging (e.g., increased resistance or reduced capacity), the battery manager 406 can adjust the charging strategy. For instance, as the battery ages, the battery manager gradually reduces the duration of fast charging to a fast charge duration 608c and increases the duration of trickle charging to a trickle charge duration 610b. This is because older batteries are more susceptible to damage from the heat and stress caused by fast charging. The battery manager 406 can adjust settings to reduce the fast charge limit from 80% to a lower threshold, say 70% or 60%, depending on the battery's condition.

Accordingly, based on the battery's performance data and predictive degradation models, the battery manager 406 can create customized charging profiles that optimize the balance between charging speed and battery health. This might involve reducing the duration of fast charging and adjusting the charging current and voltage. For example, after fast charging to the adjusted threshold, the battery manager 406 can increase the time of trickle charging to the trickle charge duration 610b. Trickle charging involves charging at a lower rate to slowly bring the battery up to total capacity or maintain it at a safe level. This method is much gentler on the battery and is particularly beneficial for aged batteries.

Referring back to FIG. 4, for older batteries, maintaining the charge at a level that prevents stress (neither too full nor too empty) can extend their lifespan. The battery manager 406 can implement a floating charge strategy to keep the battery at a safe median charge level (e.g., between 50% and 70%) through prolonged, gentle trickle charging. This strategy, by avoiding extreme charge levels, reduces the stress on the battery and helps in extending its operational life. Further, the battery manager 406 can adjust the trickle charging parameters dynamically in response to real-time data from the battery. For example, suppose the battery shows signs of stress or overheating during trickle charging.

In that case, the battery manager 406 can reduce the charge current or temporarily halt charging to allow the battery to stabilize.

In embodiments, the battery manager 406 can coordinate these charging strategies with the operational demands of the storage array. For instance, during periods of low system usage, it might extend trickle charging to prepare the battery for higher demand periods without stressing it with fast charging. By intelligently adjusting the durations and methods of fast and trickle charging based on the battery's age and condition, the battery manager 406 ensures optimal battery health and longevity. This proactive management extends the battery's operational life and enhances the overall reliability and efficiency of the storage array 102.

In embodiments, the controller 142 can include an input/output (IO) controller 408 that can delay IO write requests to the storage array 102 when the battery charge is insufficient to support the vaulting of the current size of the mirrored memory segment 304 of FIG. 3. For example, the IO controller 408 can be communicatively coupled to the storage array's host adapter (e.g., the HA 122 of FIG. 1) that receives IO operations (e.g., the IO operations 300) from one or more hosts (e.g., the hosts 106 of FIG. 1) over a network (e.g., the SAN 118 of FIG. 1). For example, the IO controller 408 can monitor the battery charge level via, e.g., the battery monitor 402 and, when it drops below a threshold necessary to support data vaulting, the IO controller 408 can temporarily hold incoming write requests.

In particular, the IO controller 408 plays a crucial role in managing the flow of write operations to the storage array, particularly under conditions where the battery's charge level may not support immediate data vaulting. It ensures data integrity and system reliability by intelligently managing write requests based on the battery's ability to sustain operations during power fluctuations. The IO controller 408 manages incoming write requests to the storage array, ensuring that data is only written to the cache when there is sufficient battery power to vault the data in the event of a power failure. This selective acceptance of write requests helps prevent data loss and system instability.

For example, the IO controller 408 can issue a "busy" signal to hosts during low battery conditions. This signal effectively communicates to the host systems that the storage array cannot process incoming write requests. Thus, the IO controller 408 uses a "busy" signal as a status indicator to inform connected systems (such as servers, networked devices, or hosts) that it cannot currently accept new write requests. Given the current battery charge, this signal is crucial for preventing the queue of write operations from exceeding the storage array's ability to process and vault data safely, thereby preventing potential data loss.

In embodiments, the IO controller 408 can refrain from acknowledging I/O (Input/Output) write requests during certain low battery conditions. For example, if the battery does not have enough charge to support the vaulting process (transferring data from volatile memory to non-volatile storage during a power loss), acknowledging write requests could lead to data being written to the cache without the assurance it can be safely stored. This poses a significant risk of data loss if a power outage occurs before the data can be vaulted. By not acknowledging write requests during low battery conditions, the IO controller 408 ensures that data consistency is maintained across the storage array. This prevents scenarios where some parts of a transaction are written to the storage array while others are not, which could corrupt data and complicate recovery efforts.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 7:
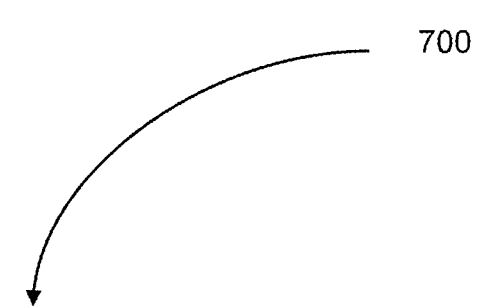
FIG. 7 is a flow diagram of a method for dynamic battery-based cache size management in accordance with embodiments of the present disclosure.

Regarding FIG. 7, a method 700 relates to dynamic battery-based cache size management. In embodiments, the controller 142 of FIG. 1 can perform all or a subset of operations corresponding to the method 700.

For example, the method 700, at 702, can include monitoring a charge level of a battery configured to provide power to a storage array. Additionally, at 704, the method 700 can include dynamically adjusting a size of a mirrored write cache partition of system memory in the storage array based on the charge level of the battery.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

monitoring a charge level of a battery configured to provide power to a storage array;

dynamically adjusting a size of a mirrored write cache partition of system memory in the storage array based on the charge level of the battery;

performing a fast charge of the battery until a fast charge level is reached, wherein the fast charge level is a portion of a maximum charge level of the battery; and performing a trickle charge of the battery after performing the fast charge of the battery until a trickle charge level of the battery is reached, wherein the trickle charge level is greater than the fast charge level and less than the maximum charge level of the battery.

2. The method of claim 1, further comprising:

selecting the adjusted size of the mirrored write cache partition to ensure the mirrored write cache partition is vaultable in response to a power loss and the charge level of the battery.

3. The method of claim 1, further comprising:

minimizing a fast charge time of the battery by controlling a charging operation based on a degradation model of the battery; and reducing the fast charge time based on an age of the battery.

4. The method of claim 1, further comprising:

performing real-time repartitioning of the mirrored write cache partition as the charge level of the battery increases.

5. The method of claim 1, further comprising:

increasing a voltage of a power source to a fast charge voltage threshold to perform the fast charge of the battery.

6. The method of claim 1, further comprising:

decreasing a voltage of a power source to a trickle charge voltage threshold to perform the trickle charge of the battery.

7. The method of claim 1, further comprising:

selecting a trickle charge voltage threshold to extend a lifetime of the battery.

8. The method of claim 1, further comprising:

delaying write operations to the storage array when the charge level of the battery is insufficient to support vaulting of a current size of the mirrored write cache partition; and refraining from acknowledging write operations received by the storage array.

9. An apparatus with a memory and processor, the apparatus configured to:

monitor a charge level of a battery configured to provide power to a storage array;

dynamically adjust a size of a mirrored write cache partition of system memory in the storage array based on the charge level of the battery;

perform a fast charge of the battery until a fast charge level is reached, wherein the fast charge level is a portion of a maximum charge level of the battery; and perform a trickle charge of the battery after performing the fast charge of the battery until a trickle charge level of the battery is reached, wherein the trickle charge level is greater than the fast charge level and less than the maximum charge level of the battery.

10. The apparatus of claim 9, further configured to:

select the adjusted size of the mirrored write cache partition to ensure the mirrored write cache partition is vaultable in response to a power loss and the charge level of the battery.

11. The apparatus of claim 9, further configured to:

minimize a fast charge time of the battery by controlling a charging operation based on a degradation model of the battery; and reduce the fast charge time based on an age of the battery.

12. The apparatus of claim 9, further configured to:

perform real-time repartitioning of the mirrored write cache partition as the charge level of the battery increases.

13. The apparatus of claim 9, further configured to:

increase a voltage of a power source to a fast charge voltage threshold to perform the fast charge of the battery.

14. The apparatus of claim 4, further configured to:

decrease a voltage of a power source to a trickle charge voltage threshold to perform the trickle charge of the battery.

15. The apparatus of claim 9, further configured to:

select a trickle charge voltage threshold to extend a lifetime of the battery.

16. The apparatus of claim 9, further configured to:

delay write operations to the storage array when the charge level of the battery is insufficient to support vaulting of a current size of the mirrored write cache partition; and refrain from acknowledging write operations received by the storage array.

*    *    *    *    *